United States Patent
Lee et al.

(10) Patent No.: US 10,696,012 B2
(45) Date of Patent: Jun. 30, 2020

(54) COMPOSITE OF MULTILAYER STRUCTURE COMPRISING POLYESTER FOAM AND POLYESTER RESIN LAYER, AND USE THEREOF

(71) Applicant: HUVIS CORPORATION, Seoul (KR)

(72) Inventors: Kwang Hee Lee, Daejeon (KR); Mee Huh, Daejeon (KR); Seung Jun Lee, Jeollanam-do (KR)

(73) Assignee: HUVIS CORPORATION, Seoul (KR)

( * ) Notice: Subject to any disclaimer, the term of this patent is extended or adjusted under 35 U.S.C. 154(b) by 0 days.

(21) Appl. No.: 15/752,301

(22) PCT Filed: Jul. 29, 2016

(86) PCT No.: PCT/KR2016/008388
§ 371 (c)(1),
(2) Date: Feb. 13, 2018

(87) PCT Pub. No.: WO2017/026716
PCT Pub. Date: Feb. 16, 2017

(65) Prior Publication Data
US 2018/0236746 A1    Aug. 23, 2018

(30) Foreign Application Priority Data

Aug. 13, 2015  (KR) .................. 10-2015-0114264
Apr. 29, 2016  (KR) .................. 10-2016-0052879

(51) Int. Cl.
*B32B 5/18*          (2006.01)
*B32B 27/08*        (2006.01)
(Continued)

(52) U.S. Cl.
CPC ................. *B32B 5/18* (2013.01); *B32B 5/02* (2013.01); *B32B 5/245* (2013.01); *B32B 5/32* (2013.01);
(Continued)

(58) Field of Classification Search
None
See application file for complete search history.

(56) References Cited

U.S. PATENT DOCUMENTS 3,170,832 A   2/1965   Wilson et al.
5,000,991 A   3/1991   Hayashi et al.
(Continued)

FOREIGN PATENT DOCUMENTS

CN   103998228 A   8/2014
CN   104136220 A   11/2014
(Continued)

OTHER PUBLICATIONS

Ueda T. et al., Foamed Laminate Excellent in Heat Insulation Efficiency, Oct. 15, 2009, machine translation of JP2009-234261 (Year: 2009).*

(Continued)

*Primary Examiner* — Chinessa T. Golden
(74) *Attorney, Agent, or Firm* — Meunier Carlin & Curfman LLC (57) ABSTRACT

The present invention relates to a composite of a multilayer structure comprising a polyester foam and a polyester resin layer, and a use thereof. A polyester composite according to the present invention provides a composite which is capable of improving a working environment, improves durability and strength and has light weight; is easy to reuse; and can be variously utilized for different uses such as a vehicle interior or exterior material or building insulation materials.

11 Claims, 1 Drawing Sheet

(51) Int. Cl.

| | |
|---|---|
| *B32B 27/36* | (2006.01) |
| *B32B 27/06* | (2006.01) |
| *B32B 5/24* | (2006.01) |
| *B32B 7/12* | (2006.01) |
| *B32B 5/32* | (2006.01) |
| *B32B 27/12* | (2006.01) |
| *C08L 67/03* | (2006.01) |
| *B32B 27/18* | (2006.01) |
| *C08J 5/12* | (2006.01) |
| *B32B 5/02* | (2006.01) |
| *B60R 13/08* | (2006.01) |
| *C08J 9/12* | (2006.01) |
| *E04B 1/90* | (2006.01) |

(52) U.S. Cl.
CPC ............... *B32B 7/12* (2013.01); *B32B 27/06* (2013.01); *B32B 27/065* (2013.01); *B32B 27/08* (2013.01); *B32B 27/12* (2013.01); *B32B 27/18* (2013.01); *B32B 27/36* (2013.01); *B60R 13/0815* (2013.01); *C08J 5/12* (2013.01); *C08J 9/12* (2013.01); *C08L 67/03* (2013.01); *E04B 1/90* (2013.01); *B32B 2262/0276* (2013.01); *B32B 2266/0264* (2013.01); *B32B 2307/212* (2013.01); *B32B 2307/518* (2013.01); *B32B 2307/546* (2013.01); *B32B 2307/718* (2013.01); *B32B 2307/732* (2013.01); *B32B 2307/734* (2013.01); *B32B 2367/00* (2013.01); *B32B 2419/00* (2013.01); *B32B 2605/00* (2013.01); *B32B 2605/003* (2013.01); *B60Y 2306/09* (2013.01); *C08J 2201/03* (2013.01); *C08J 2367/02* (2013.01)

(56) References Cited

U.S. PATENT DOCUMENTS

| | | | | |
|---|---|---|---|---|
| 2002/0012785 | A1* | 1/2002 | Leduc | B32B 5/18 428/316.6 |
| 2005/0282005 | A1* | 12/2005 | Wu | B29C 65/04 428/357 |
| 2008/0057283 | A1* | 3/2008 | Blinkhorn | B32B 5/26 428/292.1 |
| 2012/0118589 | A1* | 5/2012 | Quante | B32B 5/02 169/43 |
| 2014/0349094 | A1* | 11/2014 | Jonza | B32B 5/18 428/215 |

FOREIGN PATENT DOCUMENTS

| | | | |
|---|---|---|---|
| JP | 2000343665 | A | 12/2000 |
| JP | 2001-001436 | A | 1/2001 |
| JP | 2004-106409 | A | 4/2004 |
| JP | 2004-330711 | A | 11/2004 |
| JP | 2009-113371 | A | 5/2009 |
| JP | 2009113371 | A * | 5/2009 |
| JP | 2009113371 | A | 5/2009 |
| JP | 2009-234261 | A | 10/2009 |
| JP | 2009234261 | A * | 10/2009 |
| JP | 2012-106578 | A | 6/2012 |
| JP | 2012-171094 | A | 9/2012 |
| JP | 2013-126790 | A | 6/2013 |
| JP | 2013-209777 | A | 10/2013 |
| KR | 10-1997-0033798 | | 7/1997 |
| KR | 10-0178523 | | 5/1999 |
| KR | 10-2000-0077235 | A | 12/2000 |
| KR | 10-0363291 | | 5/2003 |
| KR | 10-2008-0027177 | | 3/2008 |
| KR | 10-2011-0034522 | A | 4/2011 |
| KR | 10-2011-0082484 | | 7/2011 |
| KR | 10-2012-0058347 | A | 6/2012 |
| KR | 10-2013-0120567 | | 11/2013 |
| KR | 10-1387465 | | 4/2014 |
| KR | 10-2014-0103207 | A | 8/2014 |
| KR | 10-2016-0036191 | A | 4/2016 |
| WO | 2013085773 | A1 | 6/2013 |

OTHER PUBLICATIONS

Nakamichi M. et al., Expanded Laminated Sheet, May 28, 2009, machine translation of JP2009-113371 (Year: 2009).*
International Search Report dated Nov. 4, 2016, from International Application No. PCT/KR2016/008388, 8 pages.
CN Office Action in Application No. 201680048337.7, dated Mar. 12, 2019.
Extended Search Report in Application No. 16835356.3, dated Feb. 19, 2019.
Notice of Reasons for Refusal in Application No. 2018-527701, dated Feb. 27, 2019.

* cited by examiner

COMPOSITE OF MULTILAYER STRUCTURE COMPRISING POLYESTER FOAM AND POLYESTER RESIN LAYER, AND USE THEREOF

TECHNICAL FIELD

The present invention relates to a composite of a multi-layer structure including a polyester foam and a polyester resin layer and the use thereof.

BACKGROUND ART

Plastic foamed molded articles are widely used throughout the industry due to properties such as excellent lightweightness, cushioning, heat insulation, moldability, and energy saving performance thereof. Polymers such as polystyrene, polyolefin, or polyvinyl chloride are amorphous and have a high melt viscosity, and their viscosity is changed little by temperature change. Such polymers are easily foamed, and thus are widely used as heat insulating materials, structural materials, cushioning materials and packaging containers, etc. However, the above-described polymers are vulnerable to fire, release environmental hormones, and have poor physical properties.

On the other hand, polyester is an eco-friendly material having excellent mechanical properties, heat resistance and chemical resistance, and thus is applicable to various fields requiring light weight and excellent physical properties.

However, polyester is difficult to mold by melting, extruding, and foaming due to being a crystalline resin. In this respect, with the development of technology, it has become possible to manufacture foamed molded articles through a foaming process using polyester. For example, U.S. Pat. No. 5,099,991 discloses a technology of producing a foamed molded article by adding a cross-linking agent to a polyester and extrusion-foaming a mixture thereof.

However, since a polyester resin has a high melt viscosity, it is important to control a viscosity of a molten resin when continuous extrusion foaming is carried out, but when additives are mixed, it becomes more difficult to control the viscosity of the molten resin. Specifically, in the case in which a separate functional additive is mixed in an extrusion-foaming process of the polyester resin, when the viscosity of the molten resin is low, bubbles generated by a foaming agent escape to the outside rather than being collected in the resin, and when the viscosity of the molten resin is high, it is difficult for the generated bubbles to be collected in the resin, causing a low foaming ratio. Thus, the foaming ratio may be lowered, and the appearance of the foamed molded article may become poor.

Prior Art Document: U.S. Pat. No. 5,000,991

DISCLOSURE

Technical Problem

The present invention relates to a composite of a multi-layer structure including a polyester foam and a polyester resin layer, and the use thereof, and is directed to provide a composite which can improve a working environment, has improved durability and strength, and is light weight.

Technical Solution

In order to achieve the above-described objective, the present invention may provide a polyester composite including n-layered (n is an integer of 2 or more) polyester foams stacked therein, and a polyester resin layer formed on one or both surfaces of each layer of the polyester foam.

Further, the present invention may provide a vehicle interior or exterior material including the polyester composite.

Further, the present invention may provide an insulation material for buildings including the polyester composite.

Advantageous Effects

The polyester composite according to the present invention can improve a working environment, provide a composite having improved durability and strength and light weight, is easily reused, and can have a variety of uses such as a vehicle interior or exterior material, an insulation material for buildings, etc.

BEST MODE OF THE INVENTION

While the invention can be modified in various ways and take on various alternative forms, specific embodiments thereof are shown in the drawings and described in detail below as examples. There is no intent to limit the present invention to the particular forms disclosed. On the contrary, the present invention is to cover all modifications, equivalents, and alternatives falling within the spirit and scope of the appended claims.

It will be further understood that the terms "comprises" and/or "comprising," when used in the present invention, specify the presence of stated features, integers, steps, operations, elements, and/or components, but do not preclude the presence or addition of one or more other features, integers, steps, operations, elements, components, and/or groups thereof.

The term "cell" as used in the present invention refers to a microstructure expanded by foaming in a polymer.

Hereinafter, the present invention will be described in detail.

The present invention relates to a composite in which a polyester foam and a polyester resin layer are combined. Specifically, the polyester foam may be a foam foamed in the form of a sheet or a board, and the polyester resin layer is a non-foamed layer, and may be a biaxially-stretched film formed in the form of a film.

The present invention relates to a polyester composite including a functional coating layer and the use thereof. As an example of the polyester composite, a polyester composite including n-layered (n is an integer of 2 or more) polyester foams stacked therein and including a polyester resin layer formed on one or both surfaces of each layer of the polyester foam may be provided.

Here, n may be 2 to 50, 2 to 40, 2 to 30, 2 to 20, 2 to 10 or 2 to 5.

Specifically, when the polyester composite includes a polyester foam and a polyester resin layer, a composite which is easily reused and has various functions can be provided.

Conventionally, when a resin is foamed to reinforce other physical properties, other additives are mixed and foamed. However, this makes it difficult to control the viscosity of the resin, and causes problems such as a decrease in a foaming ratio, defects in appearance, and a decrease in compression strength and bending strength.

Accordingly, in the composite according to the present invention, a polyester resin layer is formed on an outer surface of the formed polyester composite, and thus the desired functionality can be effectively imparted and process efficiency and degree of freedom can be improved without deteriorating physical properties of the foam.

The composite according to the present invention has a flexural modulus (or stiffness) of 400 MPa or more which is measured when a specimen is fixed with a 100 mm support span and a flexural load is applied thereto at a rate of 5 mm/min according to ASTM D 790. The inventors of the present invention found that an excellent flexural modulus can be achieved by laminating a polyester foam and a polyester resin layer. Specifically, the flexural modulus of the composite may be 400 MPa or more, 450 Mpa or more, 500 to 30,000 Mpa, 550 to 25,000 Mpa, 600 to 20,000 Mpa, 650 to 10,000 Mpa, 700 to 5,000 Mpa, 750 to 4,000 Mpa, 800 to 3,000 Mpa, or 860 to 1,000 Mpa. The composite according to the present invention can secure excellent rigidity and prevent deformation caused by physical impact or force by controlling the flexural modulus to be in the above-described range.

As an example, the polyester composite according to the present invention may have a flexural strength of 20 N/cm$^2$ or more measured according to ASTM D 790. The flexural strength may be evaluated in accordance with ASTM D 790, and may be, for example, a value measured when a specimen is fixed with a 100 mm support span and a flexural load is applied thereto at a rate of 5 mm/min. Specifically, the flexural strength may be in the range of 22 to 250 N/cm$^2$, 25 to 210 N/cm$^2$, 30 to 200 N/cm$^2$, or 50 to 180 N/cm$^2$. The composite according to the present invention can achieve an excellent flexural modulus while satisfying the flexural strength ranges above, even though the composite is not thick.

As an example, the polyester composite according to the present invention may satisfy the following Condition 1.

$$((Lt_1-Lt_0)/Lt_0)\times 100 < 1 (\%) \quad \text{[Condition 1]}$$

Condition 1 represents a rate of change in dimension (an average value of a width, a length, and a height) measured, according to an accelerated light-resistance test of KS R 0021, before and after being irradiated with light of a wavelength of 300 to 400 nm at an irradiance of 255 W/m$^2$ for 90 days, and $Lt_0$ represents a dimension before treatment and $Lt_1$ represents a dimension after treatment.

Specifically, in Condition 1, a rate of change in dimension may be less than 1% and in the range of 0.01 to 0.9%, 0.05 to 0.8%, or 0.1 to 0.6%. Here, the rate of change of dimension may be a rate of change in dimension when the volume ($Tt_0$) before treatment (before light irradiation) is 1 m$^3$. When the rate of change of dimension of the polyester composite according to the present invention satisfies the above-described range, improved durability and light resistance can be imparted, and deformation and damage caused by ultraviolet rays can be prevented even during long-term use.

For another example, the polyester composite according to the present invention may have a thermal conductivity of 0.04 W/mK or less. For example, the thermal conductivity of the composite may be in the range of 0.01 to 0.04 W/mK, 0.01 to 0.035 W/mK, or 0.02 to 0.035 W/mK. Accordingly, the polyester composite according to the present invention may realize an excellent insulation property.

The compressive strength (KS M ISO 844) of the polyester foam may be in the range of 20 to 300 N/cm$^2$. Specifically, the compressive strength of the foam may be in the range of 20 to 250 N/cm$^2$, 30 to 150 N/cm$^2$, 40 to 75 N/cm$^2$, 45 to 75 N/cm$^2$, or 55 to 70 N/cm$^2$. For example, in the case of bead foaming, a foamed molded article is prepared by putting a bead-shaped resin in a mold and foaming the resin. In the compression test of the bead-foamed molded article, cracks between beads and beads and granular fracture phenomena occur relatively easily. On the other hand, the foam according to one embodiment of the present invention is prepared by an extrusion foaming method, and thus excellent compressive strength may be achieved.

In the polyester composite according to the present invention, a sound absorption rate measured according to KS F 2805 is 0.4 NRC or more, and a transmission loss value measured according to KS F 2080 may be 10 dB or more.

For example, the sound absorption rate may be in the range of 0.4 to 1 NRC or 0.4 to 0.6 NRC, and a sound insulation rate may be in the range of 10 to 30 dB or 15 to 25 dB. As described above, the polyester composite according to the present invention can realize a high level of sound absorption and sound insulation at the same time, and can effectively absorb a sound inside or insulate from a sound outside a vehicle.

The polyester composite according to the present invention may have a flame retardancy of a third rate or more based on KS F ISO 5660-1. Specifically, according to the KS F ISO 5660-1 standard, a third rate represents a flame retardant material, a second rate represents a semi-inflammable material, and a first rate represents a fireproof material. When a material is the third rate or more, that is, the first to third rates based on KS F ISO 5660-1, the material has flame-retardant or non-flammable characteristics, and thus the risk of fire can be reduced.

The composite according to the present invention does not contain glass fibers. Conventionally, as a method for improving durability and strength, a sheet formed by mixing polyurethane (PU) and glass fiber is used, or a low weight reinforced thermoplastic (LWRT), which is a sheet-type material formed by mixing polypropylene (PP) and glass fiber, has mainly been used.

However, in the case of a material including glass fiber as described above, there is a problem in that a large amount of dust due to glass fiber is generated during work operations, thereby deteriorating the health of the worker and work environment. Further, when scraps are generated, the material cannot be recycled due to combination with other materials and should be discarded.

Accordingly, the composite according to the present invention does not contain glass fiber, and thus can be lightened and can prevent the generation of glass dust generated during processing. Further, the present invention provides a composite having excellent rigidity, strength, and durability. In the present invention, that the glass fiber is not contained means that, for example, the content of the glass fiber is 1 wt % or less, 0.01 wt % or less, 1 to 0.001 wt %, or 0.01 to 0.001 wt % based on the weight of the total composite, and specifically, represents that the glass fiber is substantially not contained.

The polyester resin layer may be in a form in which one or more materials selected from an adiabatic agent, a flame retardant agent, a VOC reducing agent, a hydrophilizing agent, a waterproofing agent, an antibacterial agent, a deodorant, and a sunscreen agent are dispersed in the resin layer.

The adiabatic agent may contain a carbonaceous component. For example, the adiabatic agent may include graphite, carbon black, graphene, and the like, and specifically may be graphite.

Further, the flame retardant is not particularly limited, and for example, may include a bromine compound, a phosphorus compound, an antimony compound, a metal hydroxide, and the like. For example, the bromine compound includes tetrabromobisphenol A and/or decabromodiphenyl ether and the like. The phosphorus compound may include an aromatic phosphoric acid ester, an aromatic condensed phosphoric acid ester, a halogenated phosphoric acid ester, and/or red phosphorus, and the antimony compound may include antimony trioxide, antimony pentoxide, and the like. Further, examples of the metal element in the metal hydroxide include one or more of aluminum (Al), magnesium (Mg), calcium (Ca), nickel (Ni), cobalt (Co), tin (Sn), zinc (Zn), copper (Cu), iron (Fe), titanium (Ti), and boron (B). Among them, metal hydroxides of aluminum or magnesium may be used. The metal hydroxide may include one type of metal element or two or more types of metal elements. For example, the metal hydroxide may include one or more of aluminum hydroxide and magnesium hydroxide.

The VOC reducing agent may include Graf and/or Bactoster Alexin and the like. Here, Bactoster Alexin is a natural sterilized material extracted from propolis.

The hydrophilic agent is not particularly limited, and examples thereof include one or more of anionic surfactants (e.g., fatty acid salts, alkyl sulfuric acid ester salts, alkylbenzenesulfonic acid salts, alkylnaphthalenesulfonic acid salts, alkyl sulfosuccinate, polyoxyethylene alkyl sulfate ester salt, etc.), nonionic surfactants (e.g., polyoxyalkylene alkyl ethers such as polyoxyethylene alkyl ethers, polyoxyethylene derivatives, sorbitan fatty acid esters, polyoxyethylene sorbitan fatty acid esters, polyoxyethylene sorbitol fatty acid esters, glycerin fatty acid esters, polyoxyethylene alkylamines, alkylalkanolamides, etc.), cationic and amphoteric surfactants (e.g., alkylamine salts, quaternary ammonium salts, alkyl betaines, amine oxides, etc.), and soluble polymers or protective colloids (e.g., gelatin, methyl cellulose, hydroxyethyl cellulose, hydroxypropyl cellulose, carboxymethyl cellulose, polyethylene glycol, polyoxyethylene-polyoxypropylene block copolymers, polyacrylamide, polyacrylic acid, polyacrylate, sodium alginate, partial-saponification products of polyvinyl alcohol, etc.).

The type of the waterproofing agent is not particularly limited, and examples thereof include one or more of a silicon-based waterproofing agent, an epoxy-based waterproofing agent, a cyanoacrylic acid-based waterproofing agent, a polyvinyl acrylate-based waterproofing agent, an ethylene vinyl acetate-based waterproofing agent, an acrylate-based waterproofing agent, a polychloroprene-based waterproofing agent, a mixture of a polyurethane resin and a polyester resin, a mixture of a polyol and a polyurethane resin, a mixture of an acrylic polymer and a polyurethane resin, a polyimide-based waterproofing agent, and a mixture of cyanoacrylate and urethane.

An example of the type of the antibacterial agent includes a composite obtained by adding one or more metals of silver, zinc, copper, and iron to one or more carriers of hydroxyapatite, alumina, silica, titania, zeolite, zirconium phosphate, and aluminum polyphosphate.

The deodorant may be a porous material. The porous material has a strong tendency to physically adsorb a fluid flowing around the porous material, and thus can adsorb a volatile organic compound (VOC). Examples of the deodorant include one or a mixture of two or more selected from the group consisting of sodium (Na), aluminum (Al), silver (Ag), copper (Cu), tin (Zn), iron (Fe), cobalt (Co), nickel (Ni), and silica, zeolite, and calcium (Ca). The particle size of the deodorant may be from 1 to 20 µm, and for example, may be from 1 to 10 µm or less. When the size of the deodorant particles exceeds 20 µm, pinholes are generated on a surface of a foam during production of the foam, deteriorating quality of a product. When the above-described numerical range is satisfied, an adsorption rate with respect to harmful substances increases due to an increase in a specific surface area.

Further, the UV blocking agent is not particularly limited, and may be, for example, an organic or inorganic UV blocking agent. Examples of the organic UV blocking agent include p-aminobenzoic acid derivatives, benzylidene camphor derivatives, cinnamic acid derivatives, benzophenone derivatives, benzotriazole derivatives and a mixture thereof, and examples of the inorganic UV blocking agent include titanium dioxide, zinc oxide, manganese oxide, zirconium dioxide, cerium dioxide, and a mixture thereof.

A component forming the functional coating layer may include an inorganic material and/or an organic material.

For example, the inorganic material may include one or more of graphite, carbon black, aluminum, zeolite, and silver.

In the case of the organic material, unlike the conventional method of foaming a resin and a functional additive together after mixing the functional additive and before the foaming of the resin, in the present invention, a resin foam layer is formed by an extrusion foaming method, and the functional coating layer is separately formed on at least one surface of the resin foam layer, and thus there is no limitation on a boiling point of the organic material used.

The polyester resin layer may include a polyester resin having repeating units represented by the following Formulas 1 and 2, and having a melting point in the range of 180 to 250° C. or a softening point in the range of 100 to 130° C.

[Formula 1]

[Formula 2]

In Formulas 1 and 2, m and n represent molar fractions of repeating units contained in a low-melting-point polyester resin, and n is 0.05 to 0.5 on the basis of m+n=1.

Specifically, the polyester resin layer may be a copolymerized polyester resin having a structure containing repeating units represented by the Formulas 1 and 2. The repeating unit represented by Formula 1 represents a repeating unit of polyethylene terephthalate (PET), and the repeating unit represented by Formula 2 serves to improve tear characteristics of a polyester resin containing a polyethylene terephthalate (PET) repeating unit. Specifically, the repeating unit represented by Formula 2 includes a methylene group (—CH$_3$) in an ethylene chain bonded to terephthalate as a side chain and secures a space for a main chain of a polymerized resin to rotate, thereby inducing an increase in the degree of freedom of the main chain and a decrease in crystallinity of the resin so that a softening point (Ts) and/or a glass transition temperature (Tg) can be controlled. This may have the same effect as in the conventional case of using isophthalic acid (IPA) containing an asymmetric aromatic ring in order to lower crystallinity of a crystalline polyester resin.

Here, when the molar fraction of the total resin is 1, the copolymer polyester resin may contain 0.5 to 1 of the repeating units represented by Formulas 1 and 2, and specifically may contain 0.55 to 1; 0.6 to 1; 0.7 to 1; 0.8 to 1; 0.5 to 0.9; 0.5 to 0.85; 0.5 to 0.7; or 0.6 to 0.95 of the repeating units represented by Formulas 1 and 2.

Further, when the total molar fraction of the repeating units represented by Formulas 1 and 2 is 1 (m+n=1), the molar fraction of the repeating unit represented by Formula 2 contained in the copolymer polyester resin may be in the range of 0.01 to 1, and specifically may be in the range of 0.05 to 1; 0.05 to 0.9; 0.05 to 0.8; 0.05 to 0.7; 0.05 to 0.6; 0.05 to 0.5; 0.05 to 0.4; 0.05 to 0.3; 0.1 to 0.3; 0.55 to 1; 0.6 to 1; 0.7 to 1; 0.8 to 1; 0.5 to 0.9; 0.5 to 0.85; 0.5 to 0.7; 0.6 to 0.95; 0.05 to 0.4, 0.15 to 0.35; or 0.2 to 0.3. Here, the copolymerized polyester resin, in which the molar fraction of the repeating unit represented by Formula 1 is 0 (m=0) and the molar fraction of the repeating unit represented by Formula 2 is 1 (n=1), may have a structure containing the repeating unit represented by Formula 2 as a main chain.

Further, the softening point of the copolymerized polyester may be in the range of 110 to 130° C., and specifically may be in the range of 110 to 120° C.; 115 to 125° C.; 118 to 128° C.; 120 to 125° C.; 121 to 124° C.; 124 to 128° C., or 119 to 126° C.

Moreover, the copolymerized polyester resin may have a glass transition temperature (Tg) of 50° C. or more. Specifically, the glass transition temperature may be in the range of 50 to 80° C., and more specifically may be in the range of 50 to 60° C., 60 to 70° C., 70 to 80° C., 50 to 55° C., 55 to 60° C., 60 to 65° C., 65 to 70° C., 68 to 75° C., 54 to 58° C., 58 to 68° C., 59 to 63° C., or 55 to 70° C.

Further, the copolymerized polyester resin may have an intrinsic viscosity (I.V) in the range of 0.5 to 0.8 dl/g. Specifically, the intrinsic viscosity (I.V) may be in the range of 0.5 dl/g to 0.65 dl/g; 0.6 dl/g to 0.65 dl/g; 0.65 dl/g to 0.70 dl/g; 0.64 dl/g to 0.69 dl/g; 0.65 dl/g to 0.68 dl/g; 0.67 dl/g to 0.75 dl/g; 0.69 dl/g to 0.72 dl/g; 0.7 dl/g to 0.75 dl/g; 0.63 dl/g to 0.67 dl/g; 0.6 dl/g to 0.75 dl/g; or 0.64 dl/g to 0.73 dl/g.

The copolymerized polyester resin according to the present invention contains the repeating unit represented by Formula 2 so that the softening point (Ts) and/or the glass transition temperature (Tg) of the polyester resin can be controlled to be within the above-described range, and thus is suitably applicable to various fields.

As an example, a fiber including the copolymerized polyester resin according to the present invention can have excellent thermal adhesiveness. Specifically, when adhesiveness at room temperature and high temperature is evaluated according to ASTM D1424 with respect to a fabric (cm×cm×cm) including the copolymerized polyester resin fiber of an average density of 2 g/cm$^2$, the adhesiveness is in the range of 60 to 80 kgf at 25±0.5° C., and the fiber may have an excellent adhesiveness in the range of 3.5 to 4.5 kgf at 100±0.5° C. More specifically, the fiber may have an adhesiveness in the range of 55 kgf to 75 kgf; 55 kgf to 60 kgf; 60 kgf to 65 kgf, 62 kgf to 68 kgf, 69 kgf to 73 kgf, or 64 kgf to 72 kgf at 25±0.5° C., and may have an adhesiveness in the range of 3.5 kgf to 3.8 kgf; 3.5 kgf to 4.2 kgf; 4.0 kgf to 4.3 kgf; 3.8 kgf to 4.5 kgf; or 3.8 kgf to 4.2 kgf at 100±0.5° C.

Further, the polyester resin layer may further include a repeating unit represented by Formula 3 in addition to the repeating units represented by Formulas 1 and 2:

[Formula 3]

in Formula 3,

X is a 2-methylpropylene group or an oxydiethylene group, and r is the mole fraction of the repeating units contained in the copolymerized polyester resin and is 0.4 or less.

Specifically, in Formula 3, r may be 0.3 or less, 0.25 or less, 0.2 or less, 0.15 or less, or 0.1 or less.

In the present invention, the content of a dispersed product generated during copolymerization, such as a cyclic compound having a polymerization degree of 2 to 3 and derived from an isophthalic acid (IPA), can be significantly reduced by expanding the range of the softening point (Ts) and glass transition temperature (Tg) of the polyester resin by controlling the repeating unit represented by Formula 3 contained in the polyester resin layer to be within the above-described fractional ratio.

As an example, the resin layer according to the present invention may contain a cyclic compound, of which the content is significantly decreased and which has a polymerization degree of 2 to 3, in an amount of 1 wt % based on the total weight of the resin, and specifically in an amount of 0.5 wt % or less, 0.4 wt % or less, 0.3 wt % or less, or 0.2 wt % or less based on the total weight of the resin, or may not contain the cyclic compound.

The polyester composite may include at least one of a polyester foam having an average thickness in the range of 1 to 5 mm and a polyester foam having an average thickness in the range of 10 to 100 mm.

For example, an average thickness of the polyester foam according to the present invention may be in the range of 1 to 5 mm. Specifically, the thickness of the foam may be in the range of 1.3 to 5 mm, 1.5 to 4.8 mm, 2 to 4.6 mm, 2.4 to 4.4 mm, 2.8 to 4.2 mm, 3 to 4.1 mm, or 3.5 to 4 mm. When the average thickness of the foam according to the present invention is within the above-described range, it is possible to prevent a decrease in strength and rigidity while realizing weight reduction of the composite.

Further, an average thickness of the polyester foam according to the present invention may be in the range of 15 to 100 nm, 15 to 80 nm, 15 to 70 nm, 20 to 65 nm, 25 to 60 nm, 30 to 50 nm, or 30 to 45 nm. When the average thickness of the foam according to the present invention is within the above-described range, the flexural modulus of the composite is increased, and thus significantly improved rigidity can be realized.

Specifically, the polyester composite according to the present invention may include one or more layers of each of a polyester foam having an average thickness in the range of 1 to 5 mm and a polyester foam having an average thickness in the range of 10 to 100 mm.

As an example, an average basis weight of the polyester resin layer according to the present invention may be in the range of 300 to 3,000 g/m². The basis weight of the resin layer may be controlled to be in the range of 1,000 g/m² or less, or 500 to 800 g/m². When the basis weight of the resin layer is excessively increased, it may cause a weight increase.

The polyester resin mainly used thus far is a high-molecular-weight aromatic polyester resin produced by a condensation polymerization reaction of terephthalic acid and 1,4-butanediol. Here, the high-molecular-weight polyester may refer to a polymer having a limiting viscosity [η] of 0.8 (dL/g) or more. The aromatic polyester resin has excellent physical properties such as a high molecular weight, thermal stability, tensile strength, and the like, but does not decompose and remains for a long time in the natural ecosystem after disposal, causing serious environmental pollution problems.

Specific examples of the type of the polyester usable in the present invention include one or more selected from the group consisting of polyethylene terephthalate (PET), polybutylene terephthalate (PBT), poly Lactic acid (PLA), polyglycolic acid (PGA), polypropylene (PP), polyethylene (PE), polyehtylene adipate (PEA), polyhydroxyalkanoate (PHA), polytrimethylene terephthalate (PTT), and polyethylene naphthalate (PEN).

Specifically, in the present invention, polyethylene terephthalate (PET) may be used as the polyester.

As an example, the polyester foam according to the present invention may be a polyethylene terephthalate (PET) foam and the polyester resin layer may be a polyethylene terephthalate resin layer. Since both the foam and the resin layer in the polyester composite according to the present invention are formed of PET, it is not necessary to separate each layer at the time of reuse, and the composite can be melted all at once and reused, thereby simplifying a manufacturing process and a recycling process.

In the polyester foam according to the present invention, 90% or more of cells are closed cells (DIN ISO4590), which represents that the value of the polyester foam measured according to DIN ISO 4590 is that 90% (v/v) or more of the cells are closed cells. For example, the average ratio of closed cells in the polyester foam may be in the range of 90 to 100% or 95 to 99%. The polyester foam according to the present invention has closed cells within the above-mentioned range such that excellent durability, rigidity, and strength characteristics can be realized in the production of the polyester composite. For example, the number of cells of the polyester foam may include 1 to 30 cells, 3 to 25 cells, or 3 to 20 cells per 1 mm².

Further, the average size of the cells may be in the range of 100 to 800 μm. For example, the average size of the cells may be in the range of 100 to 700 μm, 200 to 600 μm, or 300 to 600 μm. Here, a variation in cell size may be, for example, 5% or less, 0.1 to 5%, 0.1 to 4% or 0.1 to 3%. Accordingly, it can be seen that the polyester foam according to the present invention has uniformly foamed cells having a uniform size.

As an example, the polyester foam according to the present invention may be an extrusion foam molded article. Specifically, the types of foaming methods include bead foaming and extrusion foaming. Bead foaming is generally a method of heating a resin bead to form a primary foaming product, aging the product for a suitable period of time, filling a plate-shaped or cylindrical mold with the product, heating it again, and fusing and molding the product by secondary foaming. On the other hand, extrusion foaming is a method of heating and melting the resin and continuously extruding and foaming the resin melt, which can simplify the process steps, enable mass-production, and prevent in cracks between the beads and granular fracture which occur during bead foaming, thereby realizing superior flexural strength and compressive strength.

The polyester resin layer according to the present invention may be stretched by 2 to 8 times in a longitudinal direction (machine direction=MD) and 1.1 to 6 times in a transverse direction (perpendicular to the machine direction=TD), and may have a total draw ratio of 1.5 to 7 times.

Specifically, the polyester resin layer according to the present invention may be prepared by stretching an unstretched polyester film in the longitudinal direction (machine direction=MD) at a temperature range of about 90 to 120° C. to about 2 to 8 times and stretching the film in the transverse direction (perpendicular to the machine direction=TD) at a temperature range of about 100 to 140° C. to about 1.1 to 6 times, and then heat-treating the film at a temperature range of about 220 to 240° C. When the resin layer is formed as described above, excellent durability, rigidity, and strength can be realized without increasing the thickness of the composite according to the present invention, and the weight of the resin layer can be reduced to facilitate construction.

The polyester composite according to the present invention may further include a polyester fiber layer formed on one or both surfaces thereof.

The shape, thickness, and lamination structure of the fiber layer are not particularly limited, but the fiber layer, for example, has a form in which polyester resin fibers forming the fiber layer are fused to each other in parts. The form of the fibers being fused to each other in parts is a result of forming a resin fiber layer and performing molding while the heat and/or pressure is applied to the formed fiber layer. Thus, the form of the fiber layer may be that of randomly fused and divided in parts.

As an example, the polyester fiber layer is formed of an aggregate of modified cross-section hollow fibers. The modified cross-section hollow fiber has a hollow part, a shape maintaining part, and a volume control part on the basis of a cross-sectional shape, in which the volume control part may have a shape of protruding in a direction opposite to a center of a fiber in which an end part has a round shape.

Specifically, the volume control part may have a shape of protruding in a direction opposite to a center of a fiber in which an end part has a round shape.

In the present invention, the cross-sectional structure of the modified cross-section hollow fiber is described as a hollow part, a shape maintaining part, and a volume control part, but this is for convenience of explanation. The cross-sectional structure of the modified cross-section hollow fiber includes a hollow part forming a hole therein along the longitudinal direction of the fiber, and a shape maintaining part surrounding the hollow part.

Further, the shape maintaining part has a concavo-convex portion formed on the outer circumferential surface on the opposite side of the hollow part on the basis of a cross-sectional shape, and a protruding portion in the concavo-convex portion is referred to as a volume control part.

Specifically, a polyester resin may be used as the modified cross-section hollow fiber, and for example, polyethylene terephthalate (PET) may be used. A melt viscosity of the melt-spun PET polymer may range from 0.60 to 0.64, and an in-out type radiation cylinder capable of maximizing a cooling effect is suitable. A thickness of the fiber may be varied from 4 to 15 denier, and a fiber length may be in the range of 22 to 64 mm.

A hollow rate of the hollow part may range from about 15 to 30% of the total area of the fiber. When the hollow rate exceeds the above-described range, there may be a problem with fiber formability. When the hollow rate is less than the above-described range, a hollowness retention property and various functionalities of the present invention may be limited. The shape maintaining part refers to a fibrous shape between the hollow part and the volume control part.

The volume control part may have a shape of protruding in a direction opposite to a center of a fiber in which an end part has a round shape. Here, the uppermost portion of the end part may be defined as a peak, and the space between the volume control parts may be defined as a valley. Here, the radius of curvature of the peak may be defined as R, the radius of curvature of the valley may be defined as r, and R and r values may be identical or different for each volume control part.

As described above, strength and durability can be further improved by forming the polyester fiber layer on one or both surfaces of the polyester composite.

In the composite according to the present invention, the present invention may include at least one of a polyester foam, a polyester resin layer, and a polyester fiber layer in a plurality of layers, which may be a structure which is thermally fused or thermally bonded to each other without an adhesive material. Further, the polyester composite according to the present invention may have a structure in which an adhesive material is interposed between the respective layers For example, the polyester composite according to the present invention may further include polyester-based adhesive resin layers formed at a position between the polyester foam and the polyester resin layer, between the polyester foam and the polyester fiber layer, or between the polyester resin layer and the polyester fiber layer. The polyester-based adhesive resin layer may be a polyester-based elastic adhesive resin which is a condensation-polymerization product of a soft segment, which is a polyol, and a hard segment, which is an esterification reaction product of a diol and a dicarbonic acid. As a result, the interlayer adhesiveness may be improved, peeling may be prevented, and further, recycling becomes easy.

The present invention may provide a variety of uses which include the polyester composites described above. Specifically, the polyester composite according to the present invention may be applied to various fields such as the building industry, the automobile industry, the household goods industry, etc.

For example, the polyester composite according to the present invention may be used as an automotive interior or exterior material and/or an insulation material for buildings. Specifically, when the polyester composite according to the present invention is applied to an automobile interior or exterior material, properties such as excellent lightweightness, cushioning, insulation, moldability, strength, and energy saving performance may be realized.

Modes of the Invention

Hereinafter, the present invention will be further described in detail with reference to examples and the like according to the present invention, but the scope of the present invention is not limited thereto.

Example 1: Preparation of Polyester Composite

In order to prepare a polyester composite according to the present invention, (1) First, 100 parts by weight of a PET resin was dried at 130° C. to remove moisture. The PET resin from which the moisture was removed, 1 part by weight of pyromellitic dianhydride (PMDA), 1 part by weight of talc, and 0.1 part by weight of Irganox (IRG 1010) were mixed in a first extruder and heated to 280° C. to prepare a resin melt. Next, carbonic acid gas was mixed as a foaming agent in the first extruder, and the resin melt was sent to the second extruder and cooled to 220° C. The cooled resin melt was extruded and foamed through a die, and thereby a polyester foam was prepared.

(2) Then, a biaxially stretched film having a longitudinal elongation rate of 3 times, a transverse elongation rate of 1.5 times, and a thickness of 150 μm was heat-treated under conditions of a pressure of 3 kgf and a temperature of 250° C. for 5 seconds at the interface of the polyester foam to form a polyester resin layer. The polyester composite finally prepared had a thickness of about 3.9 mm and a basis weight of 750 g/m².

Then, the above (1) and (2) steps were sequentially performed repeatedly n (an integer of 2 or more) times so as to prepare a polyester composite.

Figure 1:
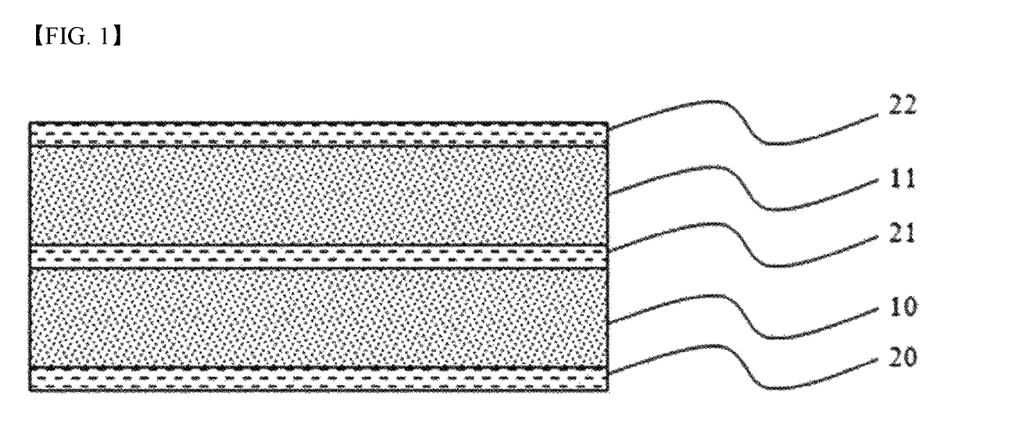
FIGS. 1 and 2 each are cross-sectional views of a polyester composite according to an embodiment of the present invention.

For example, referring to FIG. 1, there is disclosed a case in which a polyester foam is formed into a two-layer structure, and a cross-sectional view of the polyester composite in which polyester resin layers 20, 21, and 22 are heat-sealed on the interface of the polyester foams 10 and 11 can be observed.

Figure 2:
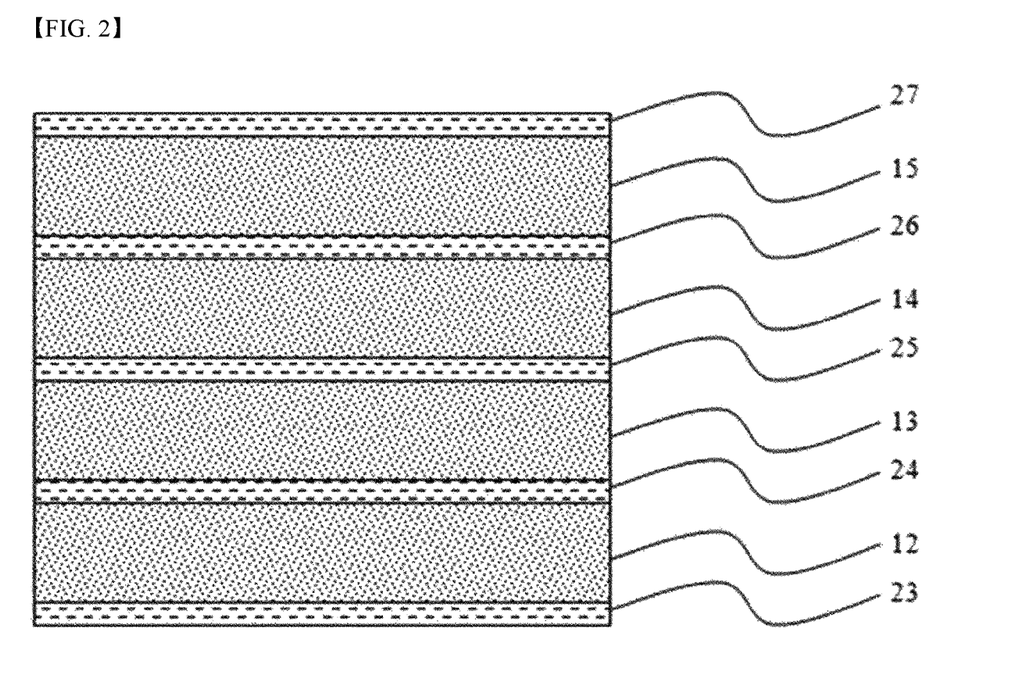

Further, referring to FIG. 2, there is disclosed a case in which a polyester foam is formed into a four-layer structure, and a cross-sectional view of the polyester composite in which polyester resin layers 23, 24, 25, 26, and 27 are heat-sealed on the interface of the polyester foams 12, 13, 14, and 15 can be observed.

Example 2: Preparation of Polyester Composite

A polyester composite was prepared in the same manner as in Example 1, except that 0.2 parts by weight of graphite was mixed based on 100 parts by weight of the resin in the preparation of the PET resin layer.

Example 3: Preparation of Polyester Composite

A polyester composite was prepared in the same manner as in Example 1, except that a PET adhesive layer was formed between the PET foam and the PET resin layer.

Example 4: Preparation of Polyester Composite

A polyester composite was prepared by forming a PET fiber layer on both surfaces of the polyester composite prepared in Example 1.

Comparative Example 1: Single-Layer Foam with No Resin Layer

A polyester foam was prepared in the same manner as in Example 1, except that the polyester resin layer was not formed and the polyester foam was formed into a single layer.

Comparative Example 2: Polypropylene Composite Containing Glass Fibers

A glass fiber mat thermoplastic (GMT) was prepared by impregnating 40 parts by weight of a glass fiber mat laminated to four layers with 60 parts by weight of polypropylene.

Comparative Example 3: Composite with Reduced Basis Weight of Foam

A polyester foam was prepared in the same manner as in Example 1, except that the basis weight of the polyester foam was about 280 g/m$^2$.

Experimental Example 1: Measurement of Cell Properties

A cell size and a cell size variation of the polyester foam prepared in Example 1 were measured. Specifically, the cell size was measured using SEM imaging of the foam, and the cell size variation within a width of 2 mm and a length of 2 was measured. The results are shown in the following Table 1.

TABLE 1

|  | Cell size (μm) | Cell size variation (%) |
|---|---|---|
| Example 1 | 300 | 5% or less |

Referring to Table 1, it can be confirmed that the polyester foam according to the present invention had a cell size of 300 μm and a cell size variation of 5% or less, which shows that the polyester foam was uniformly foamed.

Experimental Example 2: Measurement of Flexural Modulus and Flexural Strength In order to evaluate the physical properties of Example 1 and Comparative Examples 1 to 3, flexural modulus (stiffness) and flexural strength were measured.

Flexural modulus and flexural strength were measured when a specimen was fixed with a 100 mm support span and a flexural load was applied thereto at a rate of 5 mm/min according to ASTM D 790. The results are shown in the following Table 2.

TABLE 2

|  | Example 1 | Comparative Example 1 | Comparative Example 2 | Comparative Example 3 |
|---|---|---|---|---|
| Flexural modulus (Mpa) | 970 | 285 | 850 | 310 |
| Flexural strength (N/cm$^2$) | 260 | 180 | 120 | 130 |

Referring to Table 2, it can be confirmed that the polyester composite according to Example 1 had a flexural strength of about 260 N/cm2, which was the highest, and had a flexural modulus of about 970 MPa and was formed as a single layer, did not include a resin layer, and was a significant improved compared to Comparative Examples 1 to 3 prepared with a low basis weight.

Particularly, in the case of Comparative Example 2 of GMT formed by combining polypropylene with glass fiber, the flexural modulus and flexural strength were lower than those of Example 1 of the present invention, and since the glass fiber is contained, dust may be generated due to the glass fiber when a worker works, which may damage the health of the worker.

Therefore, by suitably adjusting the basis weight of the polyester foam and by compounding the polyester resin layer to a suitable thickness, it was found that the polyester composite according to the present invention had significantly improved flexural modulus and flexural strength even though glass fiber was not used. Further, since glass fiber is not contained, workers can avoid harm caused by the generation of dust when working with the composite. Further, in the composite according to the present invention, both the foam and the resin layer are formed of polyester, and thus recycling is easy.

INDUSTRIAL AVAILABILITY

The composite of a multilayer structure including a polyester foam and a polyester resin layer according to the present invention can be used as a vehicle interior or exterior material, an insulation material for buildings, and the like.

What is claimed is:

1. A polyester composite, comprising n-layered (n is an integer of or more) polyester foams stacked therein, and a polyester resin layer formed on one or both surfaces of each layer of the polyester foam,
    wherein the polyester composite has an average basis weight in a range of 500 to 800 g/m$^2$,
    wherein the polyester foam has an average size of cells in the range of 100 to 800 urn and a variation in cell size in the range of 0.1 to 5%,
    wherein the polyester composite includes a polyester foam with an average thickness in a range of 1 to 5 mm,
    wherein the polyester composite has a flexural modulus of 650 to 10,000 Mpa which is measured when a specimen is fixed with a 100 mm support span and a flexural load is applied thereto at a rate of 5 mm/min according to ASTM D 790, and
    wherein the polyester foam is a polyethylene terephthalate (PET) foam, and the polyester resin layer is a PET resin layer.

2. The polyester composite according to claim 1, wherein the polyester composite has a flexural strength of 20 N/cm$^2$ or more which is measured when a specimen is fixed with a 100 mm support span and a flexural load is applied thereto at a rate of 5 mm/min according to ASTM D 790.

3. The polyester composite according to claim 1, wherein the polyester composite satisfies the following condition 1:
    [Condition 1]
    $((Lt_1 - Lt_0)/Lt_0) \times 100 < 1 (\%)$
    wherein Condition 1 represents a rate of change of dimension (an average value of a width, a length and a height) measured before and after being irradiated with light of a wavelength of 300 to 400 nm at an irradiance of 255 W/m$^2$ for 90 days according to an accelerated light-resistance test of KS R 0021, $Lt_0$ represents a dimension before treatment, and $Lt_1$ represents a dimension after treatment.

4. The polyester composite according to claim 1, wherein the polyester composite does not include glass fiber.

5. The polyester composite according to claim 1, wherein the polyester resin layer is in a form in which one or more materials selected from an adiabatic agent, a flame retardant agent, a VOC reducing agent, a hydrophilizing agent, a waterproofing agent, an antibacterial agent, a deodorant, and a sunscreen agent are dispersed in the resin layer.

6. The polyester composite according to claim 1, wherein the polyester resin layer includes repeating units represented by the following Formulas 1 and 2, and a polyester resin having a melting point of 180 to 250° C. or a softening point of 100 to 130° C.:

[Formula 1]

[Formula 2]

wherein, in Formulas 1 and 2, m and n each represent a molar fraction of a repeating unit included in a low melting point polyester resin, and n is 0.05 to 0.5 on the basis of m+n=1.

7. The polyester composite according to claim 1, wherein the polyester resin layer is a biaxially oriented polyester film which is stretched 2 to 8 times in a longitudinal direction (a machine direction, MD) and stretched 1.1 to 6 times in a transverse direction (a direction perpendicular to the machine direction, TD), and has a total draw ratio of 1.5 to 7.

8. The polyester composite according to claim 1, further comprising a polyester fiber layer formed on one or both surfaces of the polyester composite.

9. The polyester composite according to claim 8, wherein the polyester fiber layer is formed of an assembly of modified cross section hollow fibers, the modified cross section hollow fiber includes a hollow part, a shape maintaining part and a volume control part on the basis of a cross-sectional shape, and the volume control part has a shape of protruding in a direction opposite to a center of a fiber in which an end part has a round shape.

10. A vehicle interior or exterior material comprising the polyester composite according to claim 1.

11. An insulation material for buildings comprising the polyester composite according to claim 1.

* * * * *